July 16, 1935.   J. F. TRITLE   2,008,524

EMERGENCY DYNAMIC BRAKING

Filed April 22, 1932

Inventor:
John F. Tritle,
by Charles N. Fuller
His Attorney.

Patented July 16, 1935

2,008,524

UNITED STATES PATENT OFFICE 2,008,524

EMERGENCY DYNAMIC BRAKING

John F. Tritle, Erie, Pa., assignor to General Electric Company, a corporation of New York Application April 22, 1932, Serial No. 606,899

2 Claims. (Cl. 172—179)

My invention relates to motor control systems for electric traction drives and more particularly to the provision of means for establishing an emergency dynamic braking circuit, irrespective of the direction of rotation of the motor, and has for an object the provision of a simple and reliable system of this character.

At the present time it is common practice to place the circuit controlling contactors near the driving motor and remotely operate them from a master controller located at one end of the vehicle. In many electrically operated remote control systems no provision has been made for establishing electric braking connections in case of power failure. Mechanical brakes are often provided as an additional safety measure. Nevertheless, due to a combination of circumstances there has occurred the failure of the mechanical brakes and the failure of the power supply, rendering it impossible either to brake the vehicle to a standstill or to control its speed.

In addition to providing means for positively establishing dynamic braking circuits irrespective of a failure of the power supply, or the direction of the movement of the vehicle, it is a further object of my invention to reduce to a minimum the operations required for the establishment of dynamic braking.

In carrying out my invention in one form thereof, I provide an emergency braking position on the main drum of the controller with the circuits arranged so that the motors may be connected for dynamic braking at any time by throwing the controller to this position. More specifically I arrange the circuits of a pair of series wound driving motors, so that a conducting segment provided on the main drum connects the series field winding of one motor in local circuit with the armature of the other motor for dynamic braking whenever the main drum is moved to the emergency braking position.

Figure 1:
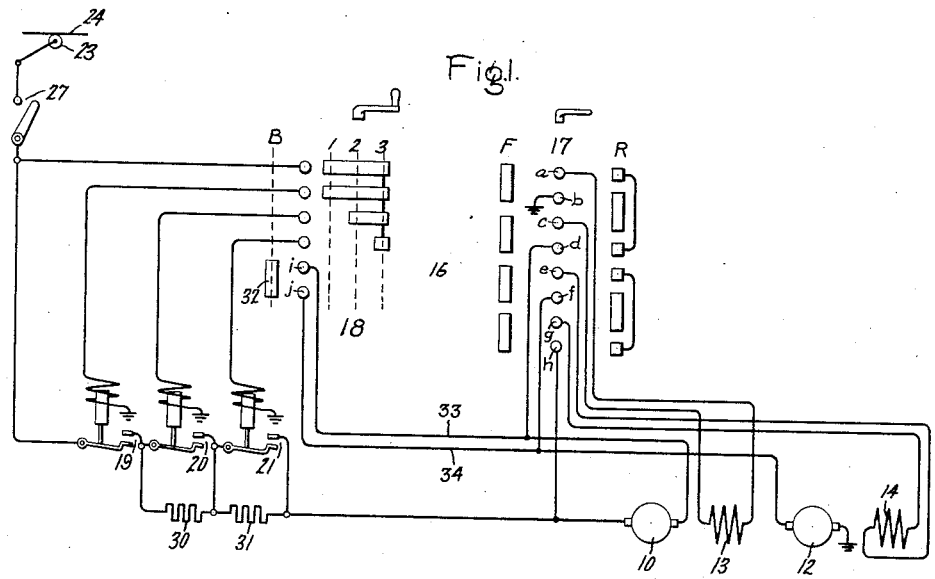
Figure 2:
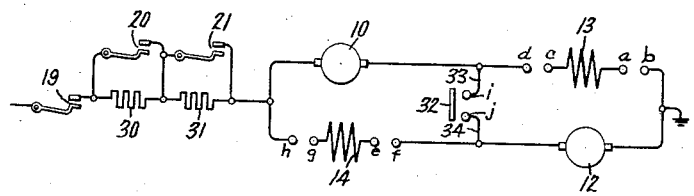

For a more complete understanding of my invention reference should now be had to the drawing, wherein I have diagrammatically illustrated in Fig. 1 a control system embodying my invention, while Fig. 2 shows a simplified circuit of the system of Fig. 1.

Referring now to the drawing, I have shown my invention in one form as applied to the control of a pair of direct current driving motors 10 and 12, of the series type, the series field windings 13 and 14, respectively, providing the excitation for the motor. A master controller 16 is provided with a reversing drum 17 of the usual type and serves by means of the contacts $a$—$h$, inclusive, to establish forward or reverse connections for the motors. A main drum 18 controls the energization of a line contactor 19 and the accelerating contactors 20 and 21. A trolley 23 is arranged to engage a supply conductor 24 and in conjunction with the usual ground connection, indicated symbolically, provide for the supply of power to the driving motors and the control circuit. A manually operable switch 27 provides means for deenergizing all of the electrical control circuits connected to the trolley.

It will be observed that for the first position of the main drum the line contactor 19 is energized and closes its contacts to connect the motor armatures to the supply circuit in parallel with each other and in series with the resistors 30 and 31. For the second position of the main drum, the first accelerating contactor 20 is energized and closes its contacts to short circuit the resistance 30, while in the third position the energizing circuit to the second accelerating contactor 21 is completed so that as soon as this contactor closes, the resistance 31 is short circuited. Of course, it will be understood that there may be a plurality of pairs of accelerating motors and a plurality of accelerating contactors arranged to vary the resistance included in the armature circuit with a corresponding increase of positions on the main drum. It will be observed that the field windings 13 and 14 respectively provided for the motors 10 and 12 are arranged to have their connections reversed by means of the reversing drum 17. In order to provide for dynamic braking connections a segment 32 is provided on the main drum so that the emergency dynamic braking circuits are completed by this segment whenever the main drum 18 is moved to the braking position B.

In explaining the operation of my invention, it will be assumed that the main drum has been operated to its third position with the reverse drum in the F position for forward movement of the car. The line contactor 19 and the accelerating contactors 20 and 21 will be closed, and motors 10 and 12 will then be operating at their full speed. Should an emergency arise requiring the quick stopping of the car, or should there be a failure of the mechanical brake, it is only necessary for the operator to remember to return the main drum to the neutral position and then to operate it to the emergency dynamic braking position B. When the main drum 18 is in the emergency dynamic braking position B, the conducting segment 32 completes circuits through contacts $i$ and $j$, and the conductors 33 and 34 so that the motor 10 is connected in a local circuit through the field winding 14 provided on the motor 12, while the armature of the motor 12 is connected in a local circuit through the field winding 13 of the motor 10. A very powerful dynamic braking force will be exerted on the vehicle inasmuch as the motor circuits completed by these connections are of very low resistance, and current of considerable magnitude may flow.

If an additional pair of driving motors is provided for the car, an additional segment corresponding to the segment 32 is provided on the main drum 18. Similarly, for more than two pairs of motors additional segments are provided for the emergency dynamic braking connections. It will, of course, be understood, by those skilled in the art, that the conventional methods of accelerating the motors may be utilized. In accordance with my invention however the manually operated main drum is always arranged to establish the emergency dynamic braking circuits irrespective of the failure of the power, the air supply, or of the mechanical brakes.

Continuing with the operation of my invention, if the vehicle should be operating in the reverse direction, the only operation required is the movement of the main drum to the emergency dynamic braking position. A powerful braking effort will thereby be effected inasmuch as each field winding is excited by the voltage generated in the armature of the other motor. By these connections the polarity of the current flowing through the field windings is always in a direction which will cause dynamic braking.

While I have shown a particular embodiment of my invention it will be understood of course that I do not wish to be limited thereto since many modifications may be made, and I therefore contemplate by the appended claims to cover any such modifications as fall within the true spirit and scope of my invention.

What I claim as new and desire to secure by Letters Patent of the United States, is,—

1. In combination, a control system for traction drives having a pair of motors provided with series field windings connected in parallel relation with each other, a reversing drum for controlling selectively the connections for said field windings to control the directions of rotation of said motors, a main drum for controlling the starting and acceleration of said motors, and means for establishing an emergency dynamic braking circuit by operation of said main drum to a given position irrespective of the direction of rotation of said motors comprising a conductive segment on said main drum and connections arranged to be completed by said segment for connecting directly the field winding of each motor in local circuit across the armature of the other motor without interrupting said connections for said field windings.

2. In combination, a control system for traction drives having a pair of motors provided with series field windings, remote control means for accelerating said motors, a circuit controller operable in a forward direction from a neutral position through a plurality of steps for controlling said remote control means, a reversing drum for controlling selectively the connections for said field windings to control the direction of rotation of said motors, and means for establishing an emergency dynamic braking circuit by operation of said circuit controller in a reverse direction through said neutral position to an emergency position irrespective of the direction of rotation of said motors comprising a conductive segment on said circuit controller, and connections arranged to be completed by said segment for connecting without interrupting said field winding connections the field winding of each motor in local circuit across the armature of the other motor.

JOHN F. TRITLE.